Aug. 6, 1963    L. HORN ET AL    3,099,899
EXPANDED METAL
Filed Jan. 21, 1960    4 Sheets-Sheet 1
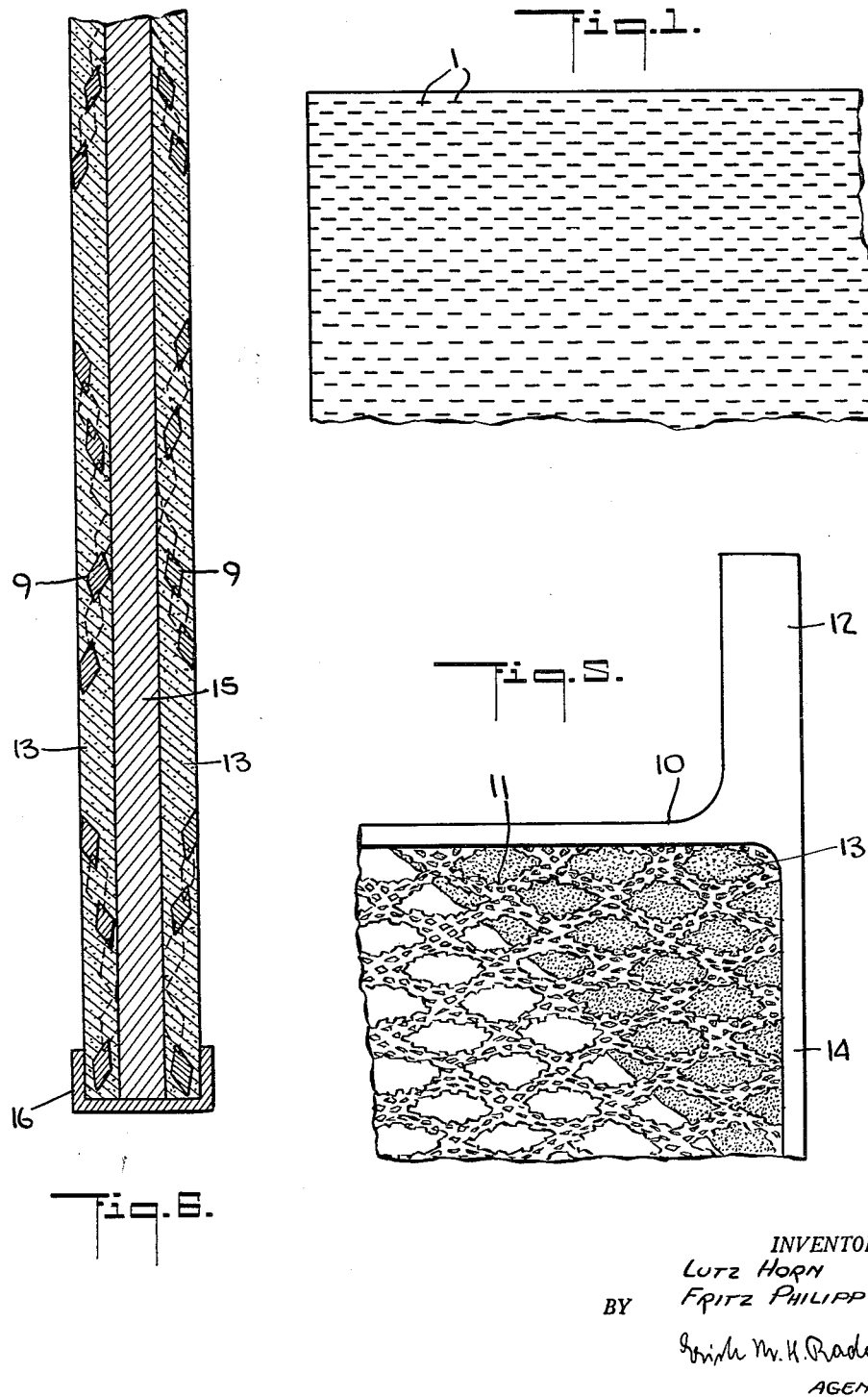
INVENTORS
BY Lutz Horn
Fritz Philipp
AGENT

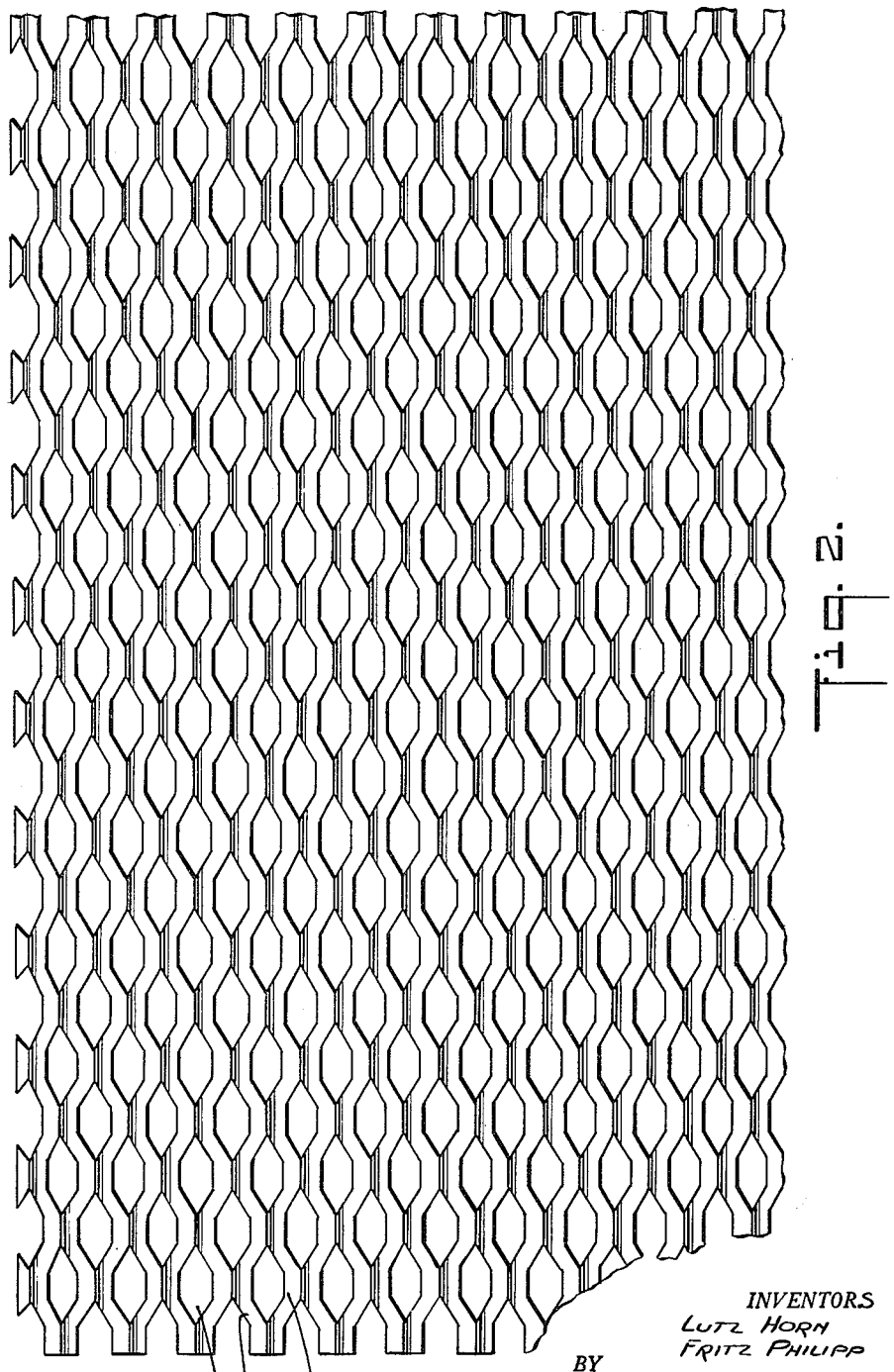

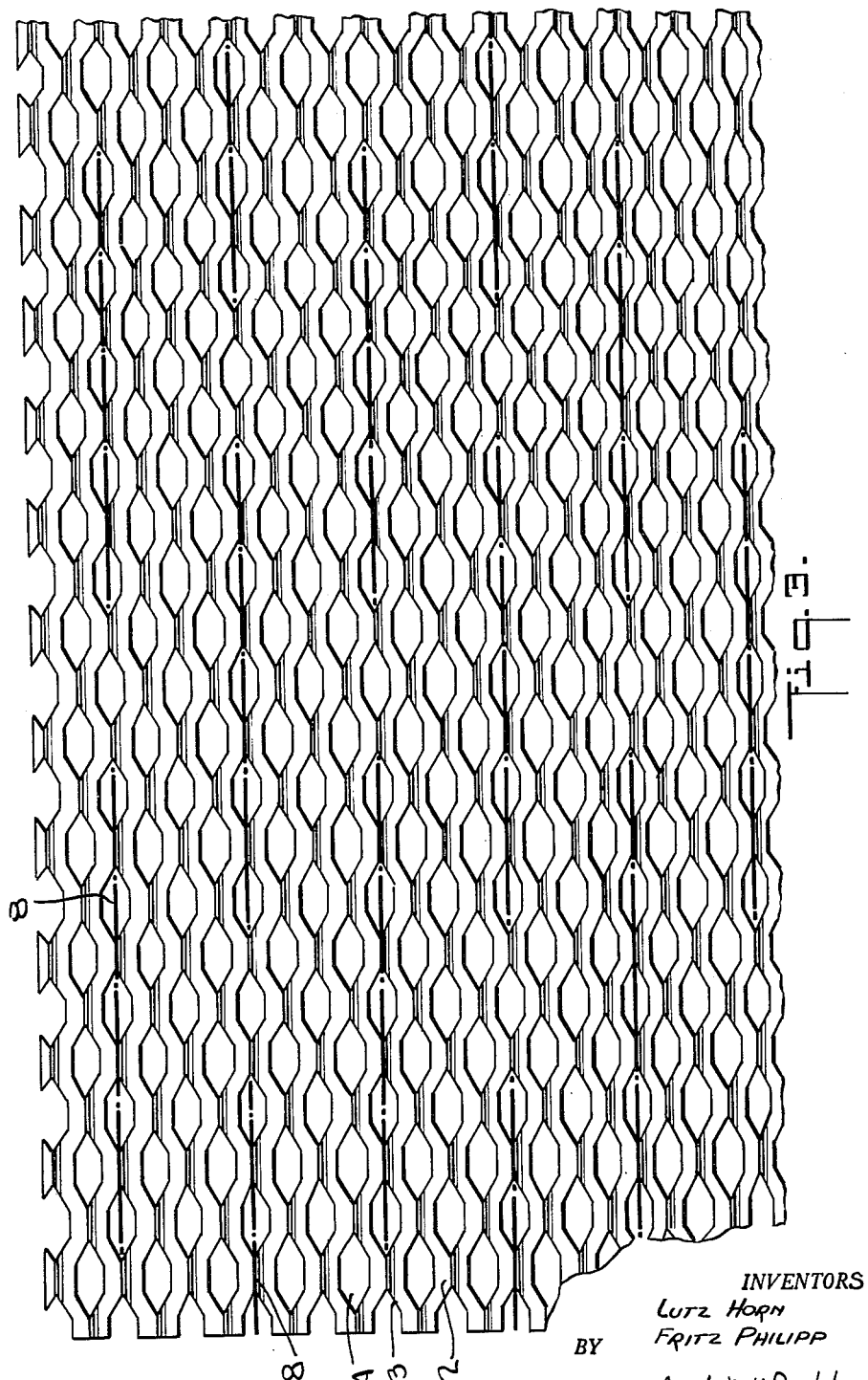

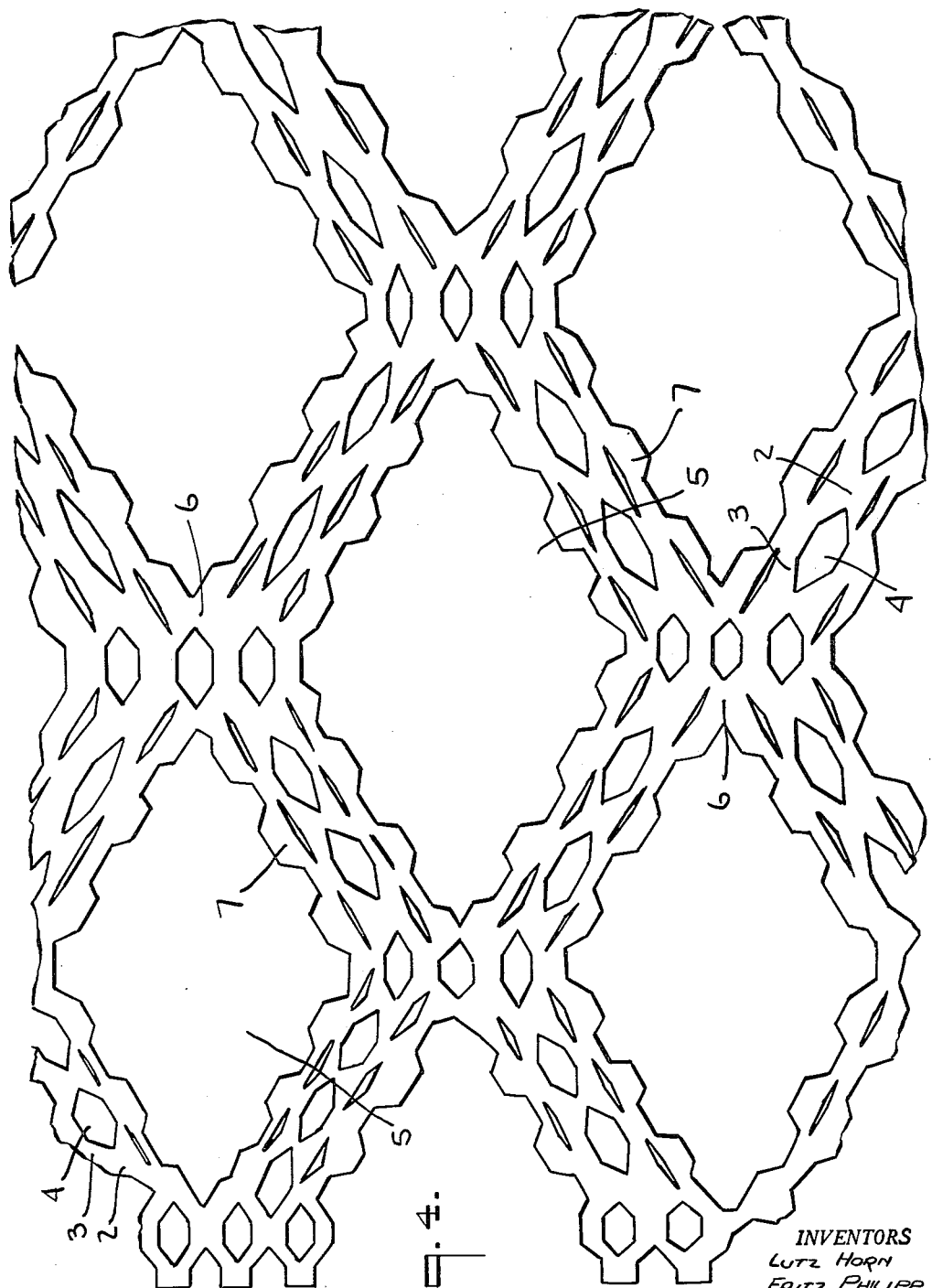

United States Patent Office 3,099,899
Patented Aug. 6, 1963

3,099,899
EXPANDED METAL
Lutz Horn, Hagen, and Fritz Philipp, Hagen-Haspe, Germany, assignors to Varta Aktiengesellschaft, Hagen, Westphalia, Germany, a company of Germany
Filed Jan. 21, 1960, Ser. No. 3,914
Claims priority, application Germany Jan. 24, 1959
3 Claims. (Cl. 50—500)

The present invention relates to a new and improved structure of expanded metal and more particularly to double stretched expanded metal useful as an electrode grid in electric cells.

Expanded metal has proved to be of value as an electrode grid for storage batteries. For instance, the electrode grid carrying the active mass may completely or partly be composed of expanded metal.

More recently, attempts have been made to use electrodes consisting of two kinds of expanded metal of different mesh size in the form of a laminated structure. It is known that expanded metal sheets as used heretofore are made by cutting and stretching metal sheets or foils. In this known process of producing expanded metal structures, the bonds of the grid form slanted planes. The thickness of the expanded metal structure is determined by the width of these planes in the direction in which the slotted metal sheets are stretched and by their angle of inclination. The connecting strands between the bonds are about half the width of said bonds but have the same angle of inclination. When looking at the expanded metal structure in the direction of the planes of the bonds, the entire structure appears to be in the shape of honeycombed, approximately hexagonal webs.

When operating a storage battery, the direction of the current lines is usually vertical to the plane of the electrode. Using conventional expanded metals, the available area traversed by the current and the effective surface of the active mass will be decreased more or less depending upon the angle of inclination. The thickness of the stretched grid and the angle of inclination are correlated to each other. An almost vertical arrangement of the strands in the stretched grid is possible only if the strands are short and narrow. The pitch angle on expanding the metal sheet in the usual manner is so small that, in projection, the area formed by the mesh openings of the expanded metal sheet and, consequently, the effective surface of the active mass is reduced considerably. As a result thereof, the active mass is partly covered by the metal and its effectiveness thus is impaired.

Another disadvantage of conventional expanded metal grids is the poor adhesiveness of the active mass to the slanted surfaces of the strands and bonds, for instance, of nickel carbonyl powder sintered to the grid. Such electrodes tend to lose their active mass during operation. The service life of storage batteries in which the carrier of the active mass is made of conventional expanded metal is considerably decreased and the voltage level and the efficiency of the active mass is noticeably impaired.

It is, therefore, one object of the present invention to provide an expanded metal grid for the active mass which is substantially free of the disadvantages of the known expanded metal grids, which facilitates access of the electrolyte to the active mass, which considerably increases the effective surface and, thus, the efficiency of the active mass, which at the same time increases adherence of the active mass thereto and substantially diminishes shedding and spalling of the active mass.

Other objects of the present invention and advantageous features thereof will become apparent as the description proceeds.

In principle an expanded metal sheet or foil according to the present invention is produced by first stamping or cutting small slits into a suitable metal sheet or foil and stretching such stamped or cut metal sheets or foils to form small meshes. Thereafter, the resulting expanded metal sheets or foils are again stamped or cut whereby slits are provided which are larger than the slits for the preliminary stretching step. The resulting pre-expanded and stamped or cut metal sheets or foils are then subjected to a final stretching whereby expanded metal sheets or foils with small and large open meshes are obtained.

Electrode grids made of such expanded metal with smaller and larger meshes permit better pasting of the active mass or better introduction of metal powder to be sintered thereto and yield electrodes of considerably improved adhesion of the active mass or sintered metal powder thereto. The active mass or the sintered powder is present in such electrode grids between and in the strands and also in the bonds formed on preliminary and final stretching. The recesses, notches, and the like produced by the final stretching on the bonds and strands of the larger meshes improve considerably the adherence of the active mass or sintered metal to the expanded metal grid. As a result thereof the active mass or the sintered metal are firmly attached to and united with the expanded metal grid. The expanded metal grid pasted with active mass serves at the same time as conductor frame.

Due to the fact that the expanded metal is obtained by stretching it twice, the total space occupied by the expanded metal grid and, consequently, its receptivity for the active mass is increased. The receptivity is calculated by deducting the space occupied by metal from the total space occupied by the expanded metal grid.

The double stretched expanded metal according to the present invention can also be used as electric current collector and conductor for the depolarizing electrodes of primary cells. Electrodes in electrolyzers, contact materials and carriers for catalytic reactions, or carriers for filters, for instance, in air filters may be made of such expanded metal. In the architectural field, such expanded metal sheets may be used as protective or decorative grilles, ventilator cover, sunshade, or for other types of partitioning, background for sign spectaculars, and other types of decorative panels.

The expanded metal sheets or foils can be made of iron, copper, silver, aluminum, or other metals and their alloys, and preferably of nickel and nickel alloys. If desired, the surface of the expanded metal is provided with a protective surface layer, for instance, by anodic oxidation or by enamelizing. The preferred and most important use of expanded metal according to the present invention is its use as electrode grid. Two or more layers of the expanded metal may be superposed and combined to yield especially effective electrode structures.

It is, of course, also possible to produce multi-layer electrodes by superposing double stretched expanded metal according to the present invention and conventional single stretched expanded metal or a non-expanded metal sheet or foil or a metal wire net or the like.

For a further understanding of the present invention reference is to be had to the following description and the accompanying drawings, wherein:

FIG. 1 illustrates a top view of a metal sheet provided with small cuts for preliminary stretching;

FIG. 2 illustrates a top view of an expanded metal sheet after preliminary stretching according to the present invention;

FIG. 3 illustrates a top view of a pre-stretched expanded metal sheet provided with cuts for final stretching;

FIG. 4 illustrates a top view of a double stretched expanded metal sheet according to the present invention;

FIG. 5 illustrates a front view of a double stretched expanded metal sheet used as electrode frame in storage batteries partly pasted with active mass; and FIG. 6 illustrates a sectional view through a composite electrode grid composed of two expanded metal grids according to the present invention and a non-expanded compact metal sheet therebetween.

In these figures like reference numerals indicate like parts throughout the several views.

FIG. 1 shows the small incisions 1 cut into the unexpanded metal sheet.

FIGS. 2 and 3 show bonds 2 of the expanded metal sheet between mesh openings 4 and strands 3 connecting said bonds 2 and forming therewith the mesh openings 4. In FIG. 3 larger slits 8 are stamped or cut into the preliminarily expanded metal sheet of FIG. 2. FIG. 4 illustrates a three-dimensional expanded metal sheet according to the invention. It consists of metal strips constituting bonds 6 and strands 7, the strands interconnecting the bonds. Each four adjacent bonds interconnected by four strands define a large mesh opening 5. The plane of the drawing may be considered as a plane extending centrally within the expanded metal sheet and the bonds 6 and strands 7 are slanted transversely in respect of the plane, as shown at 9 in FIG. 6.

Each of the bonds and strands has, itself, bonds 2 and strands 3 defining additional and substantially smaller mesh openings 4 therebetween. The bonds 2 and strands 3 are slanted transversely of a plane extending centrally within the bonds 2 and strands 3, the planes of bonds 2 and strands 3 being slanted transversely to the plane of the drawing, as pointed out hereinabove.

FIG. 5 illustrates electrode 10 composed of the double stretched expanded metal grid 11 with lug 12. Said grid 11 contains active mass 13 pasted in the small mesh openings 4 as well as in the larger mesh openings 5. Said grid 11 is mounted in frame 14.

FIG. 6 is a cross sectional view through a three-ply metal sheet consisting of the double stretched expanded metal sheets 9 and a solid unexpanded metal sheet 15, the three sheets being kept in close contact with each other by frame 16. The solid metal sheet 15 may be replaced by a conventional expanded metal sheet. It imparts greater stability and rigidity to the expanded metal sheets.

The metal sheets to be expanded may have any desired thickness. For electrodes made of steel a thickness between about 0.8 mm. and about 1.5 mm. has proved to be satisfactory.

The slits or incisions cut into the metal sheet for producing the pre-stretched expanded metal sheet of FIG. 2 are, of course, smaller than the slits or incisions 8 (FIG. 3) cut or stamped into the pre-stretched expanded metal sheet (FIG. 2). The difference in length of the unexpanded incisions 1, on the one hand, and the unexpanded incisions 8, on the other hand, is between about 1:2 and about 1:10. The preferred difference in length is about 1:5 although the invention is not limited thereto.

The small slits or incisions in the prestretched expanded metal sheet (FIG. 2) have, for instance, a length between about 0.6 mm. and about 1.2 mm. and preferably a length between about 0.8 mm. and 1.0 mm. The distance between the incisions in horizontal direction is between about 0.3 mm. and about 1.2 mm. and preferably between about 0.4 mm. and about 0.5 mm., while the distance in vertical direction, i.e. vertically to the incisions is between about 0.1 mm. and about 0.4 mm. and preferably between about 0.15 mm. and about 0.3 mm.

The larger incisions or slits as shown in FIG. 3 have, for instance, a length between about 4.0 mm. and about 10.0 mm. and preferably a length between about 5.0 mm. and about 7.0 mm. Their distance from each other in horizontal direction is between about 1.0 mm. and about 10.0 mm. and preferably between about 2.0 mm. and about 4.0 mm., while the distance in vertical direction, i.e. vertically to the larger incisions is between about 0.6 mm. and about 2.0 mm. and preferably between about 0.8 mm. and about 1.2 mm.

Preliminary stretching to produce the expanded metal sheet structure of FIG. 2 is effected by placing the one end of the metal sheet provided with small incisions into a vise and stretching it vertically to the incisions. The force to be applied depends, of course, upon the material composing the metal sheet and its thickness. For instance, for nickel sheets of a thickness of 0.1 mm. and with small incisions of 1.5 mm. length with 0.75 mm. distance between the incisions in horizontal direction and 0.2 mm. distance in vertical direction a force of 10.0 kg./sq.cm. is applied while for sheets of lead alloy as they are used for electrodes in storage batteries and having the same thickness and arrangement of incisions, the force to be applied is 10.0 kg./sq.cm. As the art of producing expanded metal is well known and familiar to those skilled in this field, it is understood that only so much of this procedure will be described as will be necessary for an understanding of this invention. Many details of the stretching process and apparatus are omitted as interfering with a consideration of the invention and will readily be supplied by those skilled in this art.

Likewise, when carrying out final stretching of the pre-expanded metal sheet of FIG. 3, the stretching force to be applied to one end of the metal sheet depends upon the material composing, and the thickness of the metal sheet and the size of the incisions. For instance, for pre-stretched expanded nickel sheets as described hereinabove with large incisions of 6.0 mm. length and a distance of 3.0 mm. between the incisions in horizontal direction and of 1.5 mm. in vertical direction, a force of 10.0 kg./sq.cm. is applied while for sheets of lead alloy as described above for pre-stretched expanded nickel sheets, the stretching force to be applied is about 10.0 kg./sq.cm.

It is understood that the larger cuts or incisions can be provided not only parallel to the smaller incisions but also vertical or at an angle thereto.

As pointed out hereinabove, the double stretched expanded metal sheets according to the present invention are of particular usefulness for making electrodes for storage batteries. The available area traversed by the current and the effective surface of the active mass are considerably increased in comparison to that of conventional expanded metal electrodes so that the active mass is more fully utilized than heretofore possible, and the service life of the electrodes is prolonged due to the better adherence of the active mass to the grid.

Of course many changes and variations in the composition of the metal sheets used for making the double stretched expanded metal according to the present invention, in the size and arrangement of the slits or incisions, in the forces used for pre-stretching and for final stretching, and the like may be made by those skilled in the art in accordance with the principles set forth herein and in the claims annexed hereto.

We claim:

1. A three-dimensional expanded metal sheet consisting of metal strips constituting bonds and strands, the strands interconnecting the bonds and each four adjacent ones of said bonds interconnected by four of said strands defining a mesh opening, the metal strips being slanted transversely in respect of a plane extending centrally within the sheet, and each of said metal strips, in turn, having bonds and strands defining additional and substantially smaller mesh openings therebetween, said latter bonds and strands being slanted transversely in respect of a plane extending centrally within the latter bonds and strands of their respective strip.

2. The expanded metal sheet of claim 1, wherein the first-mentioned mesh openings have a length about two to ten times that of the additional mesh openings.

3. The expanded metal sheet of claim 2, wherein the length of the first-mentioned mesh openings is about five times that of the additional mesh openings.

References Cited in the file of this patent

UNITED STATES PATENTS

| | | |
|---|---|---|
| 536,234 | Schaper | Mar. 26, 1895 |
| 875,154 | Clark | Dec. 31, 1907 |
| 1,080,418 | Clark | Dec. 2, 1913 |
| 1,086,027 | Clark | Feb. 3, 1914 |
| 1,090,690 | Crumbaugh | Mar. 17, 1914 |
| 1,198,066 | Schoenmehl | Sept. 12, 1916 |
| 1,738,832 | Kean | Dec. 10, 1929 |
| 2,141,400 | Mack | Dec. 27, 1938 |
| 2,215,658 | Arens et al. | Sept. 24, 1940 |
| 2,218,007 | Miller | Oct. 15, 1940 |
| 2,290,486 | Ballard et al. | July 21, 1942 |
| 2,724,733 | Hagspihl et al. | Nov. 22, 1955 |